United States Patent
Lee

(10) Patent No.: US 7,881,000 B2
(45) Date of Patent: Feb. 1, 2011

(54) METHOD OF SETTING UP A PRE-AMPLIFIER FOR HARD DISK DRIVE AND HARD DISK DRIVE INCORPORATING THE SAME

(75) Inventor: Seung-youn Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 592 days.

(21) Appl. No.: 11/052,139

(22) Filed: Feb. 8, 2005

(65) Prior Publication Data

US 2005/0190472 A1   Sep. 1, 2005

(30) Foreign Application Priority Data

Feb. 27, 2004   (KR) .................. 10-2004-0013578

(51) Int. Cl.
*G11B 5/02*   (2006.01)

(52) U.S. Cl. .................. 360/67; 360/46; 360/68
(58) Field of Classification Search ........... None
See application file for complete search history.

(56) References Cited

U.S. PATENT DOCUMENTS

| | | | |
|---|---|---|---|
| 5,159,598 A * | 10/1992 | Welles et al. ............. 714/724 |
| 5,373,402 A * | 12/1994 | Price et al. .............. 360/61 |
| 5,488,518 A * | 1/1996 | Shier ........................ 360/67 |
| 5,726,821 A * | 3/1998 | Cloke et al. ................ 360/67 |
| 5,789,689 A | 8/1998 | Doidic et al. |
| 5,812,821 A * | 9/1998 | Sugi et al. ................ 703/25 |
| 5,940,854 A * | 8/1999 | Green et al. .............. 711/112 |
| 5,986,841 A * | 11/1999 | Sorenson ................. 360/68 |
| 5,987,542 A * | 11/1999 | Bang ....................... 710/65 |
| 5,996,027 A * | 11/1999 | Volk et al. ............... 710/13 |
| 6,075,663 A * | 6/2000 | Chae ....................... 360/46 |
| 6,111,717 A * | 8/2000 | Cloke et al. .............. 360/67 |
| 6,191,909 B1 * | 2/2001 | Cloke et al. .............. 360/67 |
| 6,275,346 B1 * | 8/2001 | Kim et al. ................. 360/31 |
| 6,278,568 B1 * | 8/2001 | Cloke et al. .............. 360/51 |
| 6,370,645 B1 * | 4/2002 | Lee ........................... 713/2 |
| 6,424,475 B1 * | 7/2002 | Bhandari et al. .......... 360/31 |
| 6,532,126 B1 * | 3/2003 | Nguyen et al. ............ 360/63 |
| 6,604,153 B2 * | 8/2003 | Imamura et al. .......... 710/36 |
| 6,624,957 B1 * | 9/2003 | Yun .......................... 360/25 |
| 7,143,202 B2 * | 11/2006 | Tehrani et al. ............ 710/15 |
| 7,324,301 B2 * | 1/2008 | Tormasi ................. 360/78.12 |
| 2006/0087760 A1 * | 4/2006 | Forrer et al. ............. 360/60 |

* cited by examiner

*Primary Examiner*—Dismery E Mercedes
(74) *Attorney, Agent, or Firm*—Staas & Halsey LLP

(57) ABSTRACT

A method of setting up a pre-amplifier for a hard disk drive and a hard disk drive incorporating the method. A serial interfacing mode of the pre-amplifier is checked by writing and reading data to/from the pre-amplifier. A chip ID of the pre-amplifier is checked and a vendor of the pre-amplifier is identified using the chip ID. Default values of the pre-amplifier stored in a ROM and adaptive codes of the pre-amplifier are automatically downloaded to a register of a hard-disk controller, simplifying the pre-amplifier installation and reducing errors which may occur during manual installation of the pre-amplifier.

21 Claims, 3 Drawing Sheets

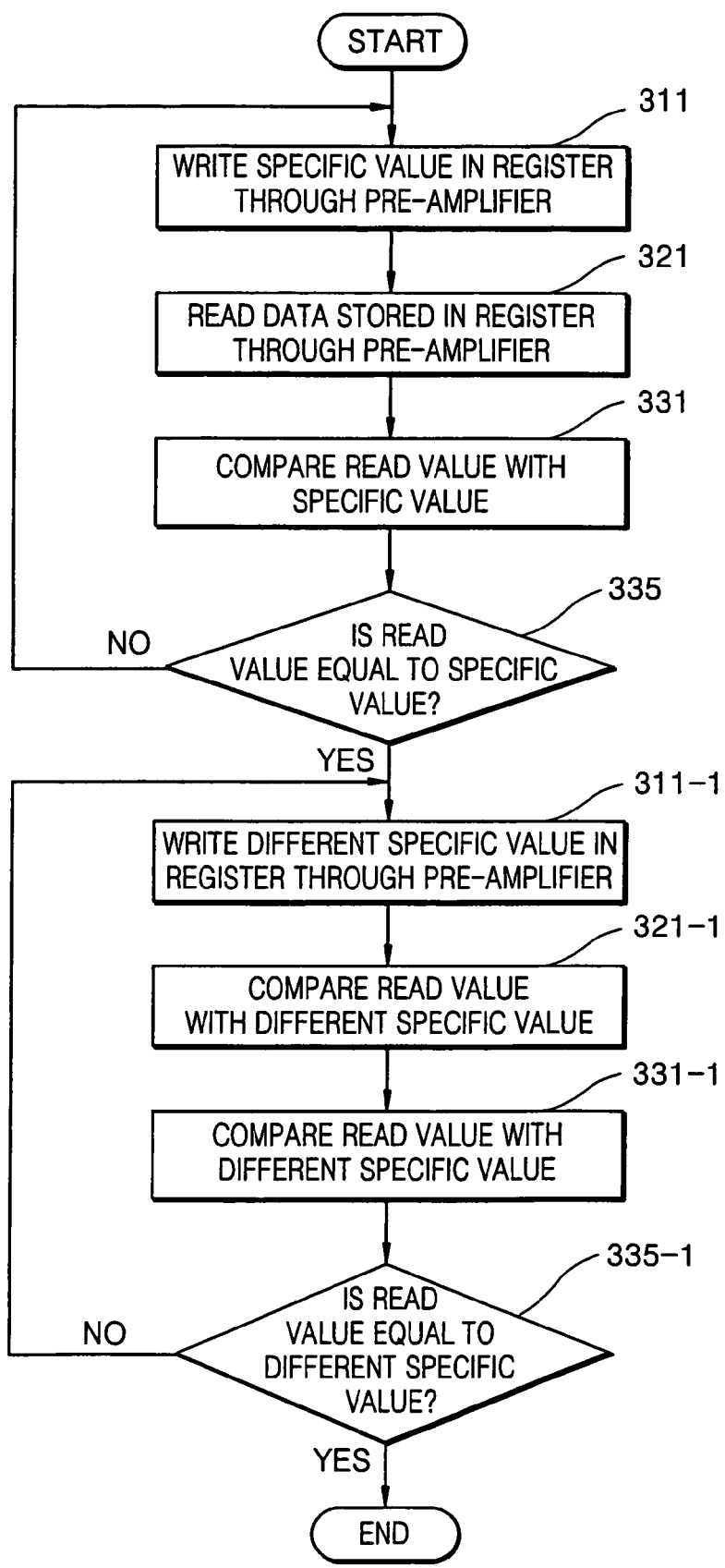

METHOD OF SETTING UP A PRE-AMPLIFIER FOR HARD DISK DRIVE AND HARD DISK DRIVE INCORPORATING THE SAME

CROSS-REFERENCE TO RELATED APPLICATIONS

This application claims the of Korean Patent Application No. 2004-13578, filed on Feb. 27, 2004, in the Korean Intellectual Property Office, the disclosure of which is incorporated herein by reference.

BACKGROUND OF THE INVENTION

1. Field of the Invention

The present invention relates to a method of setting-up a pre-amplifier for a hard disk drive, and more particularly, to a method of setting up a pre-amplifier to enable a communication between the pre-amplifier and a hard disk controller by checking serial interfacing of the pre-amplifier when the pre-amplifier is installed in the hard disk drive.

2. Description of the Related Art

A hard disk drive is a data storage unit for storing a large amount of data. The hard disk drive records or reproduces data on/from a disk using magnetic fields. As a capacity of the hard disk drive increases, the hard disk drive is widely used as a storage medium for an Audio/Video device of a multimedia system.

A hard disk drive includes a pre-amplifier for amplifying data to be read or written from/on a disk, respectively. Various vendors have supplied various pre-amplifiers which perform same basic functions; however operations for performing the basic functions vary among the pre-amplifiers provided. For this reason, when installing a pre-amplifier in a hard disk drive, a user must check a specification of the pre-amplifier and search for setting values adapted to the specification.

A specification of a pre-amplifier includes an interface setting and default values of the pre-amplifier. The default values of the pre-amplifier include basic setting values required for operating the pre-amplifier such as, for example, head information, a magnitude of a writing current, a MR (Magneto-Resistive) bias, various gain values, and mode information, additional functions or modules related to the pre-amplifier, etc.

Therefore, conventionally, since a user should check a specification of the pre-amplifier and search for suitable setting values according to the specification whenever installing the pre-amplifier, much time is required for setting-up the pre-amplifier.

SUMMARY OF THE INVENTION

The present invention provides a method of setting up a pre-amplifier in a hard disk drive using software.

According to an aspect of the present invention, there is provided a method of automatically setting up a pre-amplifier when the pre-amplifier is installed in a hard disk drive. The method includes: checking a serial interfacing mode of the pre-amplifier by performing a process of writing and reading data to/from the pre-amplifier; checking a chip ID of the pre-amplifier; selecting a vendor of the pre-amplifier using the chip ID of the pre-amplifier; downloading default values of the pre-amplifier stored in a ROM to a register of a hard-disk controller; and downloading adaptive codes of the pre-amplifier stored in a disk to the register.

The checking of the serial interfacing mode of the pre-amplifier includes writing a specific value in the register through the pre-amplifier using a hard disk controller; reading a value stored in the register from the register through the pre-amplifier using the hard disk controller; comparing the read value with the specific value; and repeating the writing of the specific value, the reading of the stored value and the comparing of the read value with the specific value until the read value is equal to the specific value.

The writing of the specific value, the reading of the stored value, the comparing of the read value with the specific value and the repeating of the writing of the specific value, the reading of the stored value, and the comparing of the read value with the specific value are performed at least twice.

The register may be installed in the hard disk controller.

The method of setting up the pre-amplifier may further include storing the default values of the pre-amplifier in the ROM and storing the adaptive codes of the pre-amplifier in a maintenance cylinder of the disk, before the checking of the serial interfacing mode of the pre-amplifier.

In the checking of the chip ID of the pre-amplifier, the hard disk controller reads a chip ID of the pre-amplifier stored in the pre-amplifier.

A plurality of vendor codes each indicating a vendor of the pre-amplifier may be stored in the ROM.

The default values of the pre-amplifier include a drive default value of the pre-amplifier and represent basic functions of the pre-amplifier.

The adaptive codes of the pre-amplifier include a zone/head default value of the pre-amplifier and a default value of the register. The method of setting up the pre-amplifier may further include: determining whether data reading and data writing from/to the hard disk drive are correctly performed, after repeating the writing of the specific value, the reading of the stored value and the comparing of the read value with the specific value until the read value is equal to the specific value.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a flowchart illustrating a process for checking serial interfacing of the pre-amplifier.

DETAILED DESCRIPTION OF THE PREFERRED EMBODIMENTS

Figure 1:
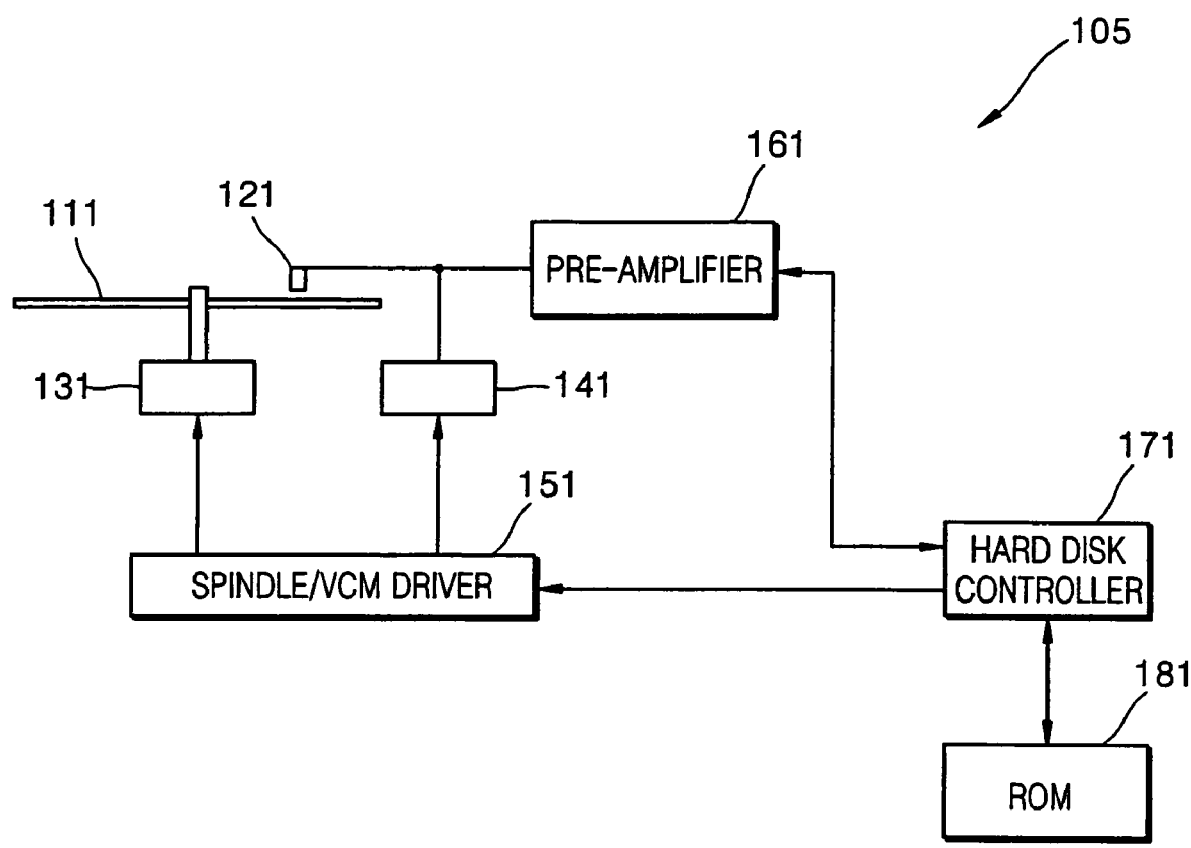
FIG. 1 is a block diagram of a hard disk drive according to the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of a hard disk drive according to the present invention. Referring to FIG. 1, a hard disk drive 105 includes a disk 111, a converter 121, a spindle motor 131, a voice coil motor (VCM) 141, a spindle/VCM driver 151, a pre-amplifier 161, a hard disk controller 171, and a ROM 181.

The disk 111 is a magnetic disk for storing data. The disk 111 has a plurality of circular tracks for storing data. The disk 111 is sectioned into a plurality of sectors, each including a data field, an identification field and a maintenance cylinder. The data field stores data, the identification field stores gray codes for identifying a sector and a track, and the maintenance cylinder stores information required for operating a hard disk, for example, information (pre-amplifier interface, register default values, zone/head parameters, etc.) required for communication between the hard disk controller 171 and the pre-amplifier 161.

The spindle motor 131 receives a signal from the spindle/VCM driver 151 to rotate the disk 111.

The voice coil motor 141 receives a signal from the spindle/VCM driver 151 to move the converter 121 across a surface of the disk 111.

The converter 121 is located near the surface of the disk 111. If data is written on both surfaces of the disk 111, two converters 121 are mounted near opposite surfaces of the disk 111. The converter 121 senses a magnetic field of the disk 111 to read data stored in the disk 111, or magnetizes the disk 111 to store data in the disk 111. The converter 121 includes a converter for magnetizing the disk 111, to record data on the disk 111, and a converter for sensing a magnetic field of the disk 111, to read data from the disk 111. The converter 121 is generally called a 'Head'.

The converter 121 reads a signal from the disk 111 and transfers the read signal to the pre-amplifier 161. The pre-amplifier 161 receives the signal from the converter 121, amplifies the received signal, and then transfers the amplified signal to the hard disk controller 171. Or, the pre-amplifier 161 amplifies a signal received from the hard disk controller 171 and transfers the amplified signal to the converter 121.

The ROM 181 stores various programs and data for controlling the hard disk drive 105.

The hard disk controller 171 controls operations of the pre-amplifier 161 and the spindle/VCM driver 151 while communicating with the ROM 181. The hard disk controller 171 includes a register 171A for storing information required for setting up the pre-amplifier 161 therein. Alternatively the hard disk controller may be connected to an external buffer (not shown) for storing the information required for setting up the pre-amplifier 161.

Figure 2:
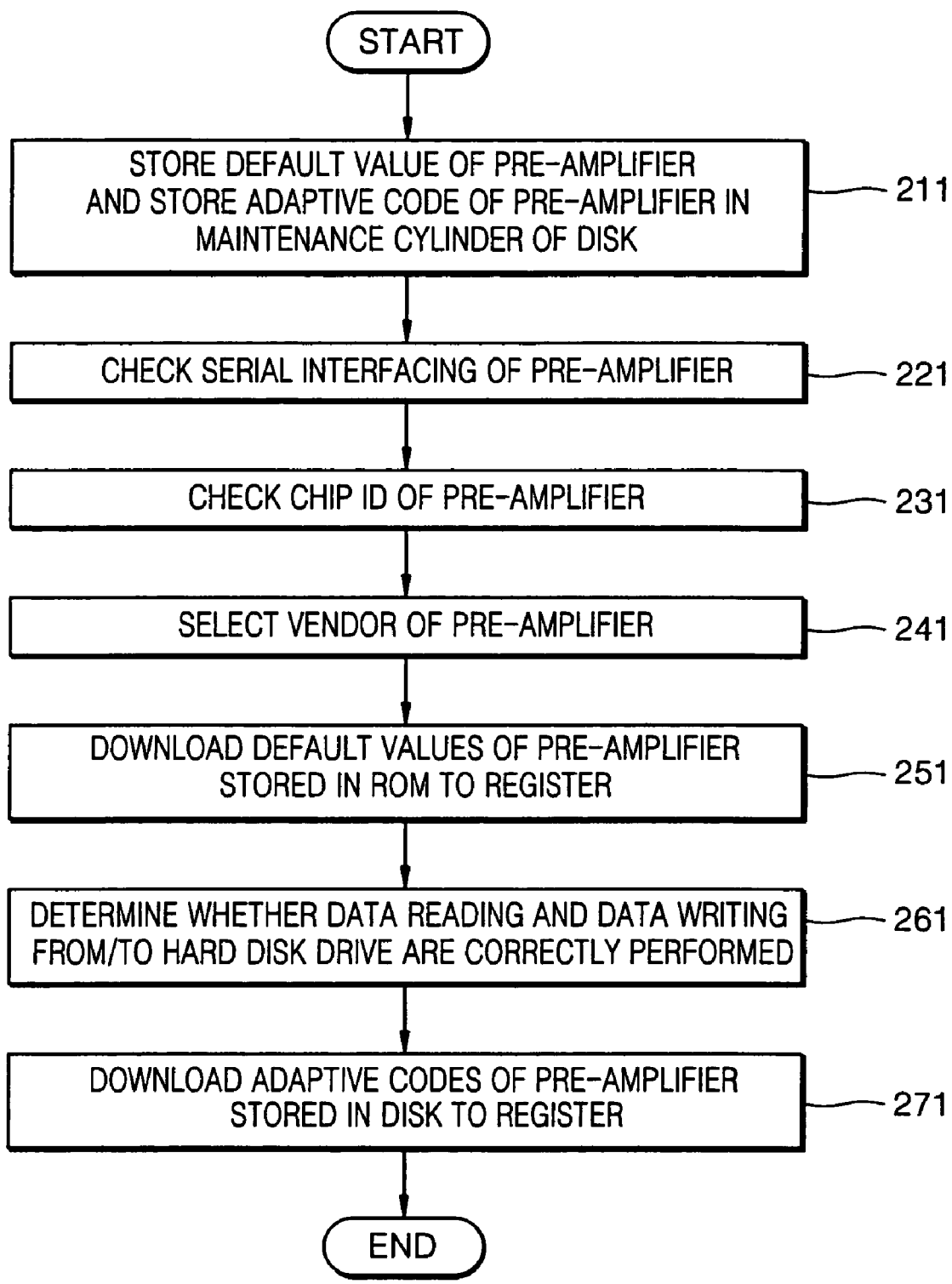
FIG. 2 is a flowchart illustrating a method of setting up a pre-amplifier for a hard disk drive, according to the present invention.

FIG. 2 is a flowchart illustrating a method of setting up a pre-amplifier for a hard disk drive, according to the present invention. Referring to FIGS. 1 and 2, the method of setting up a pre-amplifier, according to the present invention, is described as follows.

In operation 211, default values of the pre-amplifier 161 are stored in the ROM 181 and adaptive codes of the pre-amplifier 161 are stored in the maintenance cylinder of the disk 111. The default values of the pre-amplifier 161 represent basic functions of the pre-amplifier 161 including head information, a magnitude of a writing current, a MR (Magneto-Resistive) bias, various gain values, and mode information. The adaptive codes of the pre-amplifier 161 includes a zone/head default value of the pre-amplifier 161 and a default value of the register 171A of the hard disk controller 171.

In operation 221, a serial interfacing mode of the pre-amplifier 161 is checked while the hard disk controller 171 writes and reads data to/from the register 171A of the hard disk controller 171 via the pre-amplifier 161. To communicate the hard disk controller 171 with the pre-amplifier 161, an interface of the pre-amplifier 161 should be set correctly.

To correctly set the interface of the pre-amplifier 161, it is necessary to check the serial interfacing mode of the pre-amplifier 161 and install a specification for the serial interfacing mode in the register 171A of the hard disk controller 171. Operation 221 will be described in more detail later with reference to FIG. 3.

In operation 231, a chip ID of the pre-amplifier 161 is checked. That is, the hard disk controller 171 reads a chip ID of the pre-amplifier 161 stored in the pre-amplifier 161. The pre-amplifier 161 may be an integrated-circuit chip with an ID.

In operation 241, a vendor of the pre-amplifier 161 is selected using the chip ID of the pre-amplifier 161. Since pre-amplifiers may be provided by various vendors, the chip IDs of the various pre-amplifiers are different according to vendor. Accordingly, a vendor of the pre-amplifier may be determined by identifying the chip ID of the pre-amplifier 161. That is, a plurality of vendor codes each indicating a pre-amplifier vendor are stored in the ROM 181 and the hard disk controller 171 selects a vendor code corresponding to the pre-amplifier 161 among the plurality of vendor codes.

In operation 251, default values of the pre-amplifier 161 stored in the ROM 181 are downloaded to the register 171A of the hard disk controller 171. The default values of the pre-amplifier 161 include a drive default value of the pre-amplifier 161 and represent basic functions of the pre-amplifier 161. Here, a buffer (not shown) that is connected to the hard disk controller 171 may be substituted for the register 171A of the hard disk controller.

In operation 261, the hard disk controller 171 determines whether data reading and data writing from/to the hard disk drive 105 are correctly performed. By performing a process of writing data in the disk 111 and reading pre-stored data from the disk 111 via the pre-amplifier 161, the hard disk controller 171 checks whether data reading and data writing from/to the hard disk drive 105 are correctly performed. If the data reading and data writing from/to the hard disk drive 105 are not correctly performed, the process is returned to operation 221.

If the data reading and data writing from/to the hard disk drive 101 are correctly performed, adaptive codes of the pre-amplifier 161 stored in the disk 111 are downloaded to the register 171A of the hard disk drive 171.

FIG. 3 is a flowchart illustrating a process for checking a serial interfacing mode of a pre-amplifier. Referring to FIGS. 1 and 3, a process for checking the serial interfacing mode of a pre-amplifier is described as follows.

The serial interfacing mode of the pre-amplifier 161 is set into one among four serial interfacing modes of A through D as shown in Table 1.

TABLE 1

|  | A | B | C | D |
|---|---|---|---|---|
| Address | MSB | MSB | LSB | LSB |
| Data | MSB | LSB | MSB | LSB |

That is, the serial interfacing modes of the pre-amplifier 161 include: a serial interfacing mode A that reads both an address and data sequentially from the Most significant Bit (MSB); a serial interfacing mode B that reads the address and data sequentially from MSB and Least Significant bit (LSB), respectively; a serial interfacing mode C that reads the address and data sequentially from LSB and MSB, respectively; and a serial interfacing mode D that read both the address and data sequentially from LSB, when reading a value stored in the register 171A of the hard disk controller 171 through the pre-amplifier 161.

To check whether the setting state of the pre-amplifier 161 corresponds to a particular mode among the four serial interfacing modes, the following operations are performed.

In operation 311, the hard disk controller 171 writes specific values in the register 171A through the pre-amplifier 161. At this time, the hard disk controller 171 applies a pre-amplifier enable signal, a clock signal, and a data signal to the pre-amplifier 161. Only while the pre-amplifier enable signal is in an enable state, is data written in the register 171A or read from the register 171A.

The data signal comprises a read/write indication bit, chip selection bits, address bits and data bits.

The read/write indication bit indicates that data is read from the register 171A or that data is written to the register 171A. For example, a read/write indication bit is "1" indicates that data is written to the register 171A, and a read/write indication bit is "0" indicates that data is read from the register 171A.

The chip selection bits indicate a selected pre-amplifier among a plurality of pre-amplifiers.

The address bits, which are generally four bits, comprise addresses of data to be stored in the register or addresses of data stored in the register 171A.

The data bits, which are generally 8 bits, comprise data to be written in the register 171A or data read from the register 171A.

In operation 321, the hard disk controller 171 reads a value stored in the register 171A through the pre-amplifier 161.

For example, after the hard disk controller 171 writes an address '1' (hexadecimal) and data '21' (hexadecimal) in the register 171A through the pre-amplifier 161, the hard disk controller 171 reads the values stored in the register 171A through the pre-amplifier 161. Since the written values are converted into binary numbers and stored, the address is stored as '0001' and the data is stored as '0010 0001.' At this time, if the serial interfacing mode of the pre-amplifier 161 is set to the serial interfacing mode A of Table 1, the read address is '0001' and the read data is '0010 0001'. However, if the serial interfacing mode of the pre-amplifier 161 is set to the serial interfacing mode D of Table 1, the read address is '1000' and the read data is '1000 0100'.

As such, when the hard disk controller 171 reads values stored in the register 171A through the pre-amplifier 161, the read values are different according to the serial interfacing mode of the pre-amplifier 161.

In operation 331, the values read through the pre-amplifier 161 are compared with the specific values.

If the values read through the pre-amplifier 161 are not equal to the specific values, the process is returned to operation 311.

If the values read through the pre-amplifier 161 are equal to the specific values, the operations 311 through 331 are repeated in operations 311-1, 321-1, 331-1, and 335-1. This is because a case may exist where the specific values are equal to the values read through the pre-amplifier 161 regardless of the set serial interfacing mode of the pre-amplifier 161.

For example, if the data is '81' (hexadecimal), the data '81' is converted into a binary number '1000 0001'. Although the data '1000 0001' is written in the register 171A through the pre-amplifier 161 using the serial interfacing mode B of Table 1, resultant read data becomes '1000 0001' regardless of the interfacing mode. That is, numbers which convert to binary numbers having a same sequence of bits from an LSB to an MSB and from the MSB to the LSB are not good candidate numbers for testing the serial interfacing mode, e.g., Hex 00 (0000000), Hex 18 (00011000), and Hex A5 (10100101).

Accordingly, to prevent such an error, the operations 311 through 335 may be repeated two or more times.

As described above, according to the present invention, operations that install a pre-amplifier 161 in a hard disk drive 105 and set up the pre-amplifier 161 may be performed using software.

Accordingly, temporal loss and operational load, caused by using an individual code programmed to be adapted to a specification of the pre-amplifier whenever operating a pre-amplifier mounted in a hard disk drive, may be reduced. Also, an error, generated in the pre-amplifier due to using an unsuitable pre-amplifier code, may be prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of automatically setting up a pre-amplifier when the pre-amplifier is installed in a hard disk drive, the method comprising:

checking a serial interfacing mode of the pre-amplifier by writing and reading data to and from the pre-amplifier, respectively;

checking a chip ID of the pre-amplifier;

selecting a vendor code corresponding to the pre-amplifier, from among a plurality of vendor codes stored in a ROM, using the chip ID of the pre-amplifier;

downloading default values of the pre-amplifier stored in the ROM to a register of a hard-disk controller; and downloading adaptive codes of the pre-amplifier stored in a disk to the register, wherein the checking of the serial interfacing mode of the pre-amplifier comprises:

writing a specific value in the register through the pre-amplifier using a hard disk controller, and by using the default values and adaptive codes downloaded to the register;

reading the specific value stored in the register from the register through the pre-amplifier using the hard disk controller; comparing the read value with the specific value; and repeating the writing of the specific value, the reading of the specific value and the comparing of the read value with the specific value until the read value is equal to the specific value.

2. The method of claim 1, wherein the writing of the specific value, the reading of the specific value and the comparing of the read value with the specific value are performed at least twice.

3. The method of claim 1, wherein the register is installed in the hard disk controller.

4. The method of claim 1, further comprising: storing the default values of the pre-amplifier in the ROM and storing the adaptive codes of the pre-amplifier in a maintenance cylinder of the disk prior to the checking of the serial interfacing mode of the pre-amplifier.

5. The method of claim 1, wherein the checking of the chip ID of the pre-amplifier comprises:

reading the chip ID of the pre-amplifier stored in the pre-amplifier.

6. The method of claim 1, further comprising:

storing a plurality of vendor codes each indicating a vendor of the pre-amplifier in the ROM.

7. The method of claim 1, wherein the default values of the pre-amplifier include head information, a magnitude of a writing current, a MR (Magneto-Resistive) bias, gain values and mode information of the pre-amplifier.

8. The method of claim 1, wherein the adaptive codes of the pre-amplifier include a zone/head default value of the pre-amplifier.

9. The method of claim 1, further comprising:
determining whether the pre-amplifier has been correctly set to read and write data from/to the hard disk drive, after the downloading of the default values of the pre-amplifier.

10. A hard disk drive, comprising:
a pre-amplifier having a chip ID stored therein and operable according to a predetermined serial interfacing mode;
a disk which stores adaptive codes of the pre-amplifier;
a ROM which stores default values of the pre-amplifier and a plurality of vendor codes; and
a hard disk controller having a storage register, wherein the hard disk controller;
checks the serial interfacing mode of the pre-amplifier by writing and reading data to and from the pre-amplifier, respectively;
reads the chip ID of the pre-amplifier;
selects a vendor code corresponding to the pre-amplifier, from among the plurality of vendor codes stored in the ROM, using the chip ID read from the pre-amplifier;
downloads default values of the pre-amplifier stored in the ROM to the storage register;
downloads adaptive codes of the pre-amplifier stored in a disk to the storage register; and
writes a specific value in the register through the pre-amplifier by using the default values and adaptive codes downloaded to the register, reads the specific value in the register and compares the read value with the specific value, to check the serial interfacing mode of the preamplifier, wherein the hard disk controller repeatedly writes the specific value, reads the specific value and compares the read value with the specific value until the read value is equal to the specific value.

11. The disk drive of claim 10, wherein the hard disk controller writes the specific value, reads the specific value and compares the read value with the specific value at least twice.

12. The disk drive of claim 10, wherein the adaptive codes of the pre-amplifier are stored in a maintenance cylinder of the disk.

13. The disk drive of claim 10, wherein the default values of the pre-amplifier comprise a drive default value of the pre-amplifier and represent basic functions of the pre-amplifier.

14. The disk drive of claim 10, wherein the adaptive codes of the pre-amplifier comprise a zone/head default value of the pre-amplifier.

15. The disk drive of claim 10, wherein the hard disk controller determines whether the pre-amplifier has been correctly set to read and write data from and to the hard disk drive, respectively, after the downloading of the default values of the pre-amplifier.

16. The disk drive of claim 10, wherein:
when the read value is equal to the specific value, both an address and data are sequentially read from a most significant bit.

17. The disk drive of claim 10, wherein: when the read value is equal to the specific value, an address and data are sequentially read from a most significant bit and a least significant bit, respectively.

18. The disk drive of claim 10, wherein: when the read value is equal to the specific value, an address and data are sequentially read from a least significant bit and a most significant bit, respectively.

19. The disk drive of claim 10, wherein: when the read value is equal to the specific value, an address and data are both sequentially read from at least a least significant bit.

20. The disk drive of claim 10, wherein the specific value is a number which converts to a binary number having a sequence of bits from a Least Significant Bit (LSB) to a Most Significant Bit (MSB) which is different from a sequence of bits from the MSB to the LSB.

21. A method of automatically setting up a pre-amplifier of a hard disk drive comprising:
selecting a vendor code corresponding to the pre-amplifier, from among a plurality of vendor codes stored in a ROM, based on a chip ID of the pre-amplifier;
downloading default values of the pre-amplifier to a register of a hard-disk controller;
downloading adaptive codes of the pre-amplifier to the register; and
checking a serial interfacing mode of the pre-amplifier comprising:
writing a specific value in the register via the pre-amplifier by using the default values and adaptive codes downloaded to the register;
reading the specific value stored in the register from the register via the pre-amplifier; repeating the writing of the specific value, and the reading of the specific value until the read value is equal to the specific value, wherein the writing and reading are performed by the hard-disk controller.

* * * * *

UNITED STATES PATENT AND TRADEMARK OFFICE
CERTIFICATE OF CORRECTION

| | | |
|---|---|---|
| PATENT NO. | : 7,881,000 B2 | Page 1 of 1 |
| APPLICATION NO. | : 11/052139 | |
| DATED | : February 1, 2011 | |
| INVENTOR(S) | : Seung-youn Lee | |

It is certified that error appears in the above-identified patent and that said Letters Patent is hereby corrected as shown below:

Column 8, Line 24 (Approx.), In Claim 19, before "a least" delete "at least".

Signed and Sealed this
Nineteenth Day of April, 2011

David J. Kappos
*Director of the United States Patent and Trademark Office*